United States Patent
Fukuhara et al.

(10) Patent No.: US 11,609,181 B2
(45) Date of Patent: Mar. 21, 2023

(54) SPECTRAL ANALYSIS APPARATUS AND SPECTRAL ANALYSIS METHOD

(71) Applicant: HAMAMATSU PHOTONICS K.K., Hamamatsu (JP)

(72) Inventors: Masashi Fukuhara, Hamamatsu (JP); Kazuhiko Fujiwara, Hamamatsu (JP); Yoshihiro Maruyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 292 days.

(21) Appl. No.: 16/755,720

(22) PCT Filed: Sep. 26, 2018

(86) PCT No.: PCT/JP2018/035764
§ 371 (c)(1),
(2) Date: Apr. 13, 2020

(87) PCT Pub. No.: WO2019/077955
PCT Pub. Date: Apr. 25, 2019

(65) Prior Publication Data
US 2021/0190679 A1    Jun. 24, 2021

(30) Foreign Application Priority Data
Oct. 16, 2017 (JP) .............................. JP2017-200176

(51) Int. Cl.
*G01N 21/27* (2006.01)
*G01N 21/65* (2006.01)
(Continued)

(52) U.S. Cl.
CPC ........... *G01N 21/276* (2013.01); *G01N 21/65* (2013.01); *G06K 9/6257* (2013.01);
(Continued)

(58) Field of Classification Search
None
See application file for complete search history.

(56) References Cited

FOREIGN PATENT DOCUMENTS

| CN | 101144860 A | 3/2008 |
|---|---|---|
| CN | 104897583 A | 9/2015 |

(Continued)

OTHER PUBLICATIONS

Chen, Yushi, et al. "Deep feature extraction and classification of hyperspectral images based on convolutional neural networks." IEEE Transactions on Geoscience and Remote Sensing 54.10 (2016): 6232-6251. (Year: 2016).*

(Continued)

*Primary Examiner* — David Perlman
(74) *Attorney, Agent, or Firm* — Faegre Drinker Biddle & Reath LLP

(57) ABSTRACT

A spectrum analysis apparatus is an apparatus for analyzing an analysis object on the basis of a spectrum of light generated in the analysis object containing any one or two or more of a plurality of reference objects, and includes an array conversion unit, a processing unit, a learning unit, and an analysis unit. The array conversion unit generates two-dimensional array data on the basis of a spectrum of light generated in the reference object or the analysis object. The processing unit includes a deep neural network. The analysis unit causes the array conversion unit to generate the two-dimensional array data on the basis of the spectrum of light generated in the analysis object, inputs the two-dimensional array data to the deep neural network, and analyzes the analysis object on the basis of data output from the deep neural network.

16 Claims, 22 Drawing Sheets

(51) Int. Cl.
*G06K 9/62* (2022.01)
*G06N 3/04* (2006.01)
*G06N 3/08* (2006.01)
*G06V 10/70* (2022.01)
*G06V 10/82* (2022.01)

(52) U.S. Cl.
CPC ......... *G06K 9/6277* (2013.01); *G06K 9/6298* (2013.01); *G06N 3/04* (2013.01); *G06N 3/08* (2013.01); *G06V 10/70* (2022.01); *G06V 10/82* (2022.01); *G01N 2201/1296* (2013.01)

(56) References Cited

FOREIGN PATENT DOCUMENTS

| DE | 102016208087 B3 | 5/2017 |
| JP | H10-501333 A | 2/1998 |
| JP | 2010-527017 A | 8/2010 |
| JP | 2011-053171 A | 3/2011 |
| JP | 2017-090130 A | 5/2017 |
| WO | WO-95/033189 A1 | 12/1995 |
| WO | WO-2008/138996 A1 | 11/2008 |

OTHER PUBLICATIONS

Selvaraju, Ramprasaath R., et al. "Grad-CAM: Why did you say that?." arXiv preprint arXiv:1611.07450 (2016). (Year: 2016).*

Acquarelli, J. et al., "Convolutional neural networks for vibrational spectroscopic data analysis," Analytica Chimica Acta, vol. 954, Dec. 27, 2016, pp. 22-31.

Chen, S. et al., "Convolutional Neural Network for Classification of Solar Radio Spectrum," Proceedings of the IEEE International Conference on Multimedia and Expo Workshops (ICMEW) 2017, Jul. 10, 2017, pp. 198-201.

Liu, J. et al., "Deep Convolutional Neural Networks for Raman Spectrum Recognition : A Unified Solution," arXiv:1708.09022v1, Aug. 18, 2017, pp. 1-14.

Russakovsky, O. et al., "ImageNet Large Scale Visual Recognition Challenge," Int. J. Comput. Vis. 115, 2015, pp. 211-252.

Selvaraju, R. R. et al., "Grad-CAM: Visual Explanations from Deep Networks via Gradient-based Localization," arXiv:1610.02391v3, 2017, 24 pages.

Smilkov, D. et al., "SmoothGrad: removing noise by adding noise," arXiv:1706.03825v1, 2017, 10 pages.

International Preliminary Report on Patentability dated Apr. 30, 2020 for PCT/JP2018/035764.

Beril Ozbalci et al., "Rapid analysis of sugars in honey by processing Raman spectrum using chemometric methods and artificial neural networks", Food Chemistry, vol. 136, Issues 3-4, Feb. 1-15, 2013, p. 1444-p. 1452.

Tao Peng et al., "Research of Hyperspectral Imagery Neural Network Classification Method Based on Region Feature Spectrum", Chinese Journal of Electron Devices, vol. 31, No. 4, Aug. 31, 2008, p. 1331-p. 1337.

* cited by examiner

Fig.4

Train. label

| PC | PET | PMMA | PS | PVC | PVDC | SR |
|---|---|---|---|---|---|---|
| 1 | 0 | 0 | 0 | 0 | 0 | 0 |

*Fig.6*

Output label

| PC | PET | PMMA | PS | PVC | PVDC | SR |
|---|---|---|---|---|---|---|
| 0.8 | 0 | 0.2 | 0 | 0 | 0 | 0 |

Predicted class

| | PC | PET | PMMA | PS | PVC(h) | PVDC | SR |
|---|---|---|---|---|---|---|---|
| PC | 40 | 0 | 0 | 0 | 0 | 0 | 0 |
| PET | 0 | 40 | 0 | 0 | 0 | 0 | 0 |
| PMMA | 0 | 0 | 40 | 0 | 0 | 0 | 0 |
| PS | 0 | 0 | 0 | 40 | 0 | 0 | 0 |
| PVC(h) | 0 | 0 | 0 | 0 | 40 | 0 | 0 |
| PVDC | 0 | 0 | 0 | 0 | 0 | 40 | 0 |
| SR | 0 | 0 | 0 | 0 | 0 | 0 | 40 |

True class (b)

Predicted class

| | PC | PET | PMMA | PS | PVC(h) | PVDC | SR |
|---|---|---|---|---|---|---|---|
| PC | 40 | 0 | 0 | 0 | 0 | 0 | 0 |
| PET | 0 | 40 | 0 | 0 | 0 | 0 | 0 |
| PMMA | 0 | 0 | 40 | 0 | 0 | 0 | 0 |
| PS | 0 | 0 | 10 | 30 | 0 | 0 | 0 |
| PVC(h) | 0 | 0 | 0 | 0 | 40 | 0 | 0 |
| PVDC | 0 | 0 | 0 | 0 | 0 | 40 | 0 |
| SR | 0 | 0 | 0 | 0 | 0 | 0 | 40 |

True class

*Fig.9*

Train. label

| PC | PET | PMMA | PS | PVC | PVDC | SR |
|---|---|---|---|---|---|---|
| 0.8 | 0 | 0.2 | 0 | 0 | 0 | 0 |

Fig.10

Output label

| PC | PET | PMMA | PS | PVC | PVDC | SR |
|---|---|---|---|---|---|---|
| 0.75 | 0 | 0.15 | 0 | 0 | 0.10 | 0 |

Predicted class

| True class | | PC | PET | PMMA | PS | PVC(h) | PVDC | SR |
|---|---|---|---|---|---|---|---|---|
| | PC | 40 | 0 | 0 | 0 | 0 | 0 | 0 |
| | PET | 0 | 40 | 0 | 0 | 0 | 0 | 0 |
| | PMMA | 0 | 0 | 38 | 2 | 0 | 0 | 0 |
| | PS | 0 | 0 | 0 | 40 | 0 | 0 | 0 |
| | PVC(h) | 0 | 0 | 0 | 0 | 40 | 0 | 0 |
| | PVDC | 0 | 0 | 0 | 0 | 0 | 40 | 0 |
| | SR | 0 | 0 | 0 | 0 | 0 | 0 | 40 |

(b)

Predicted class

| True class | | PC | PET | PMMA | PS | PVC(h) | PVDC | SR |
|---|---|---|---|---|---|---|---|---|
| | PC | 40 | 0 | 0 | 0 | 0 | 0 | 0 |
| | PET | 0 | 40 | 0 | 0 | 0 | 0 | 0 |
| | PMMA | 0 | 0 | 40 | 0 | 0 | 0 | 0 |
| | PS | 0 | 0 | 0 | 40 | 0 | 0 | 0 |
| | PVC(h) | 0 | 0 | 0 | 0 | 36 | 4 | 0 |
| | PVDC | 0 | 0 | 5 | 0 | 0 | 35 | 0 |
| | SR | 0 | 0 | 0 | 0 | 0 | 0 | 40 |

SPECTRAL ANALYSIS APPARATUS AND SPECTRAL ANALYSIS METHOD

TECHNICAL FIELD

The present invention relates to an apparatus and a method for analyzing an analysis object on the basis of a spectrum of light generated in the analysis object.

BACKGROUND ART

A spectrum of light generated in an analysis object has a shape corresponding to types or ratios of components contained in the analysis object. Therefore, the analysis object can be analyzed on the basis of the spectrum of light generated in the analysis object. The spectrum of light generated in the analysis object includes a spectrum of light (for example, reflected light, transmitted light, scattered light, fluorescent light, light generated by a nonlinear optical phenomenon (for example, Raman scattering or the like)) generated in the analysis object in response to light irradiation on the analysis object, and further, includes a spectrum of chemiluminescent light generated by a chemical reaction in the analysis object. In addition, the spectrum of light includes a spectrum of refractive index or absorption coefficient obtained from transmitted light or reflected light. Here, the light is not limited to ultraviolet light, visible light, and infrared light, and includes, for example, terahertz waves.

Conventionally, multivariate analysis has been used for performing the spectrum analysis. As the multivariate analysis, principal component analysis, classifiers, regression analysis and the like are used, or combined and used in a known analysis method. Further, Patent Document 1 also suggests performing the spectrum analysis using a deep neural network. With the deep neural network, it is possible to achieve highly efficient and highly accurate image recognition or the like (see Non Patent Document 1), so that, if the spectrum analysis is performed using the deep neural network, it is expected to achieve highly efficient and highly accurate analysis compared to the case using the multivariate analysis.

CITATION LIST

Patent Literature

Patent Document 1: Japanese Patent Application Laid-Open Publication No. 2017-90130

Non Patent Literature

Non Patent Document 1: O. Russakovsky et al., "ImageNet Large Scale Visual Recognition Challenge", Int. J. Comput. Vis. 115, 2015, pp. 211-252
Non Patent Document 2: R. R. Selvaraju et al., "Grad-CAM: Visual Explanations from Deep Networks via Gradient-based Localization", arXiv:1610.02391, 2017
Non Patent Document 3: D. Smilkov et al., "SmoothGrad: removing noise by adding noise", arXiv:1706.03825, 2017

SUMMARY OF INVENTION

Technical Problem

However, Patent Document 1 does not describe any specific procedure for performing the spectrum analysis using the deep neural network. Further, Non Patent Document 1 does not suggest performing the spectrum analysis using the deep neural network.

The present invention has been made to solve the above problem, and an object thereof is to provide an apparatus and a method capable of performing highly efficient and highly accurate spectrum analysis.

Solution to Problem

A spectrum analysis apparatus according to the present invention is an apparatus for analyzing an analysis object on the basis of a spectrum of light generated in the analysis object containing any one or two or more of a plurality of reference objects, and includes (1) an array conversion unit for generating two-dimensional array data on the basis of a spectrum of light; (2) a processing unit including a deep neural network; and (3) an analysis unit for inputting the two-dimensional array data generated by the array conversion unit on the basis of the spectrum of light generated in the analysis object into the deep neural network, and analyzing the analysis object on the basis of data output from the deep neural network.

A spectrum analysis method according to the present invention is a method for analyzing an analysis object on the basis of a spectrum of light generated in the analysis object containing any one or two or more of a plurality of reference objects, and includes (1) an array conversion step of generating two-dimensional array data on the basis of a spectrum of light; and (2) an analysis step of, using a processing unit including a deep neural network, inputting the two-dimensional array data generated in the array conversion step on the basis of the spectrum of light generated in the analysis object into the deep neural network, and analyzing the analysis object on the basis of data output from the deep neural network.

Advantageous Effects of Invention

According to the present invention, highly efficient and highly accurate spectrum analysis can be performed.

BRIEF DESCRIPTION OF DRAWINGS

FIG. 4 is a table illustrating values of training labels of respective resin materials for learning a Raman spectrum of PC as a reference object.

FIG. 6 is a diagram illustrating an example of output labels when two-dimensional array data based on the Raman spectrum of PC as the analysis object is input to a deep neural network.

FIG. 7 includes tables summarizing classification results in a first example and a first comparative example, and illustrates (a) a classification result of the first example and (b) a classification result of the first comparative example.

FIG. 9 is a table illustrating values of training labels of respective resin materials for learning a Raman spectrum of a mixture of PC and PMMA (mixing ratio 0.8:0.2).

FIG. 10 is a diagram illustrating an example of output labels when two-dimensional array data based on the Raman spectrum of the mixture of PC and PMMA (mixing ratio 0.8:0.2) as the analysis object is input to the deep neural network.

FIG. 21 includes tables summarizing classification results in a third example and a third comparative example, and illustrates (a) a classification result of the third example and (b) a classification result of the third comparative example.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description. The present invention is not limited to these examples.

Figure 1:
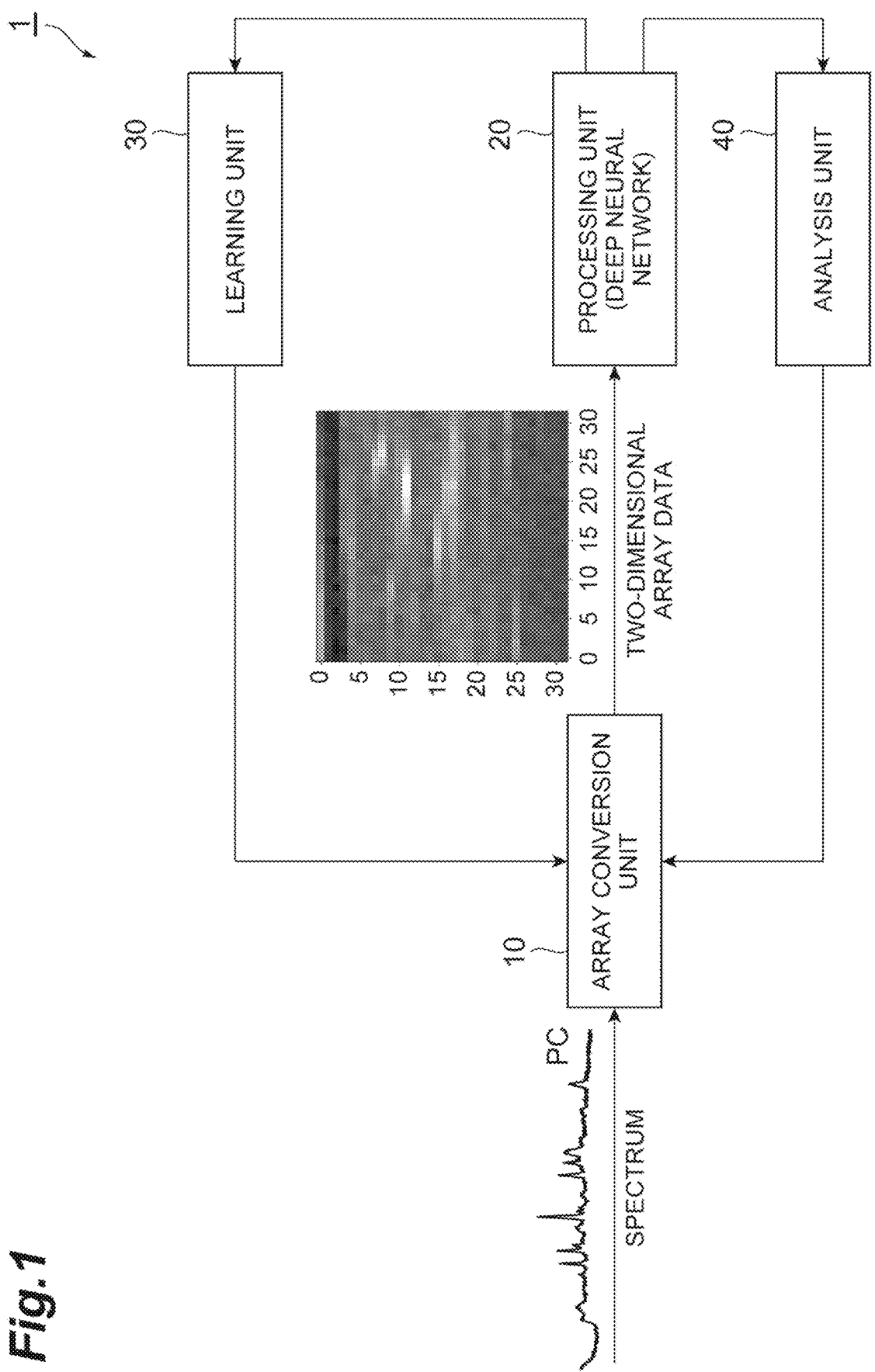
FIG. 1 is a diagram illustrating a configuration of a spectrum analysis apparatus 1.

FIG. 1 is a diagram illustrating a configuration of a spectrum analysis apparatus 1. The spectrum analysis apparatus 1 is an apparatus for analyzing an analysis object on the basis of a spectrum of light generated in the analysis object containing any one, or two or more, of a plurality of reference objects, and includes an array conversion unit 10, a processing unit 20, a learning unit 30, and an analysis unit 40.

The array conversion unit 10 generates two-dimensional array data on the basis of the spectrum of light generated in the reference object or the analysis object. The array conversion unit 10 preferably generates the two-dimensional array data by normalizing the spectrum so that the peak intensity of the spectrum has a predetermined value. Further, it is also preferable that the array conversion unit 10 generates the two-dimensional array data by arranging M×N data pieces including all or part of data of the spectrum in M rows and N columns. M and N are integers of 2 or more. M and N may be different from each other or may be equal to each other.

The processing unit 20 includes a deep neural network. The deep neural network is preferably a convolutional neural network. The convolutional neural network includes a convolutional layer for extracting a feature and a pooling layer for compressing the feature which are provided alternately. The processing unit 20 may perform processing in the deep neural network by a central processing unit (CPU), and further, perform preferably by a digital signal processor (DSP) or a graphics processing unit (GPU) capable of achieving higher speed processing.

The learning unit 30 causes the array conversion unit 10 to generate the two-dimensional array data on the basis of the spectrum of light generated in each of the plurality of reference objects, inputs the two-dimensional array data to the deep neural network as training data, and trains the deep neural network. Further, the learning unit 30 causes the array conversion unit 10 to generate the two-dimensional array data on the basis of the spectrum of light generated in a mixture containing any one or two or more of the reference objects and having a known mixing ratio, inputs the two-dimensional array data to the deep neural network as training data, and trains the deep neural network using the mixing ratio. Such learning of the deep neural network is referred to as deep learning.

The analysis unit 40 causes the array conversion unit 10 to generate the two-dimensional array data on the basis of the spectrum of light generated in the analysis object, inputs the two-dimensional array data to the deep neural network as analysis object data, and analyzes the analysis object on the basis of the data output from the deep neural network. The analysis unit 40 classifies the analysis object as any one of the plurality of reference objects on the basis of the data output from the deep neural network. Further, the analysis unit 40 determines the mixing ratio of the reference object contained in the analysis object on the basis of the data output from the deep neural network.

The array conversion unit 10 provides the training data and the analysis object data respectively as two-dimensional array data identically in M rows and N columns. Therefore, when the spectrum data size is not M×N, or when the data size is different between the training spectrum and the analysis object spectrum, it is preferable for the array conversion unit 10 to perform decimation, trimming, supplement of an arbitrary value, and the like, on the spectrum data. Further, the array conversion unit 10 preferably provides the training data and the analysis object data respectively as the two-dimensional array data identically in M rows and N columns, by an interpolation method (spline interpolation, Lagrange interpolation, Akima interpolation, or the like) used in the field of numerical analysis, or a compression method (wavelet transform, discrete cosine transform, or the like) used in the field of image processing.

The spectrum analysis apparatus 1 may include an input unit that receives selection of a spectrum of the analysis object, instruction of analysis start, selection of analysis conditions, and the like. The input unit is, for example, a keyboard, a mouse, or the like. Further, the spectrum analysis apparatus 1 may include a display unit that displays an analysis result and the like. The display unit is, for example, a liquid crystal display, or the like. The spectrum analysis apparatus 1 may include a storage unit that stores an analysis object spectrum, an analysis result, and the like. The spectrum analysis apparatus 1 may include a computer.

A spectrum analysis method using the above spectrum analysis apparatus 1 includes an array conversion step by the array conversion unit 10, a learning step by the learning unit 30, and an analysis step by the analysis unit 40.

That is, in the array conversion step, two-dimensional array data is generated by the array conversion unit 10 on the basis of the spectrum of light generated in the reference object or the analysis object. In the learning step, using the processing unit 20 including the deep neural network, the two-dimensional array data generated in the array conversion step on the basis of the spectrum of light generated in each of the plurality of reference objects is input to the deep neural network as the training data to train the deep neural network. In the analysis step, using the processing unit 20 including the deep neural network, the two-dimensional array data generated in the array conversion step on the basis of the spectrum of light generated in the analysis object is input to the deep neural network as the analysis object data to analyze the analysis object on the basis of the data output from the deep neural network.

When the deep neural network has learned once in the learning step, the analysis step can be repeated afterward, so that it is not necessary to perform the learning step every time the analysis step is performed. For the same reason, when the deep neural network has already learned, the learning unit 30 is unnecessary.

In the present embodiment, the two-dimensional array data generated based on the spectrum is input to the deep neural network for performing the spectrum analysis, and thus, the spectrum analysis can be performed stably with high efficiency and high accuracy, even in the case where complicated classification is performed or a large number of spectra is classified. Further, in the present embodiment, quantitative analysis can be performed using the deep neural network.

Next, first to third examples are described. In each example, seven types of resin materials listed below were used as reference objects. As an analysis object, an object containing any one or two types of these seven types of resin materials was used.

polycarbonate (PC)
polyethylene terephthalate (PET)
polymethyl methacrylate (PMMA)
polystyrene (PS)
hard polyvinyl chloride (PVC(h))
polyvinylidene chloride (PVDC)
silicone rubber (SR)

The reference object and the analysis object were irradiated with laser light having a center wavelength of 785 nm, and the intensity of generated Raman scattered light was measured at each value of a Raman shift amount (wavenumber) to obtain the Raman spectrum.

In the first and second examples, the data size of each spectrum was 1024. In the array conversion step, normalization was performed so that the peak intensity had a predetermined value for each Raman spectrum, and 1024 data pieces of each Raman spectrum were arranged in 32 rows and 32 columns to generate two-dimensional array data. In generating the two-dimensional array data, the first 32 data pieces in the 1024 data pieces arranged in the order of the wavenumber of the Raman spectrum were arranged in order from the first column to the 32nd column in the first row, the next 32 data pieces were arranged in order from the first column to the 32nd column in the second row, and the processes were repeatedly performed, and the last 32 data pieces were arranged in order from the first column to the 32nd column in the 32nd row. In the third example, the data size of the analysis object spectrum was 256.

Figure 2:
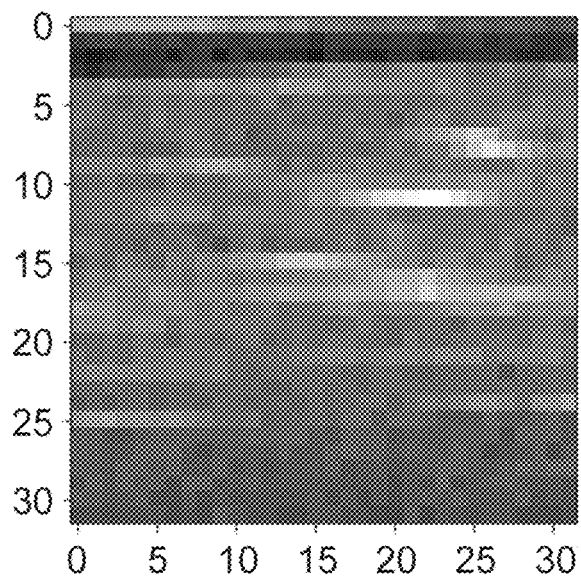
FIG. 2 is a diagram illustrating an example of two-dimensional array data generated on the basis of a Raman spectrum.

FIG. 2 is a diagram illustrating an example of the two-dimensional array data generated on the basis of the Raman spectrum. This figure illustrates two-dimensional array data as a two-dimensional image. The number of pixels in this figure is 32×32. Each pixel is illustrated in lighter tones as the data value is larger, while illustrated in darker tones as the data value is smaller. The number of gradations is 256. This figure, however, illustrates a two-dimensional image with 256 gradations for convenience, but a real number of about 0 to 70 was used as a value for each pixel in actual processing.

In the first example, the analysis object was classified as any one of the seven types of reference objects, as described below.

Figure 3:
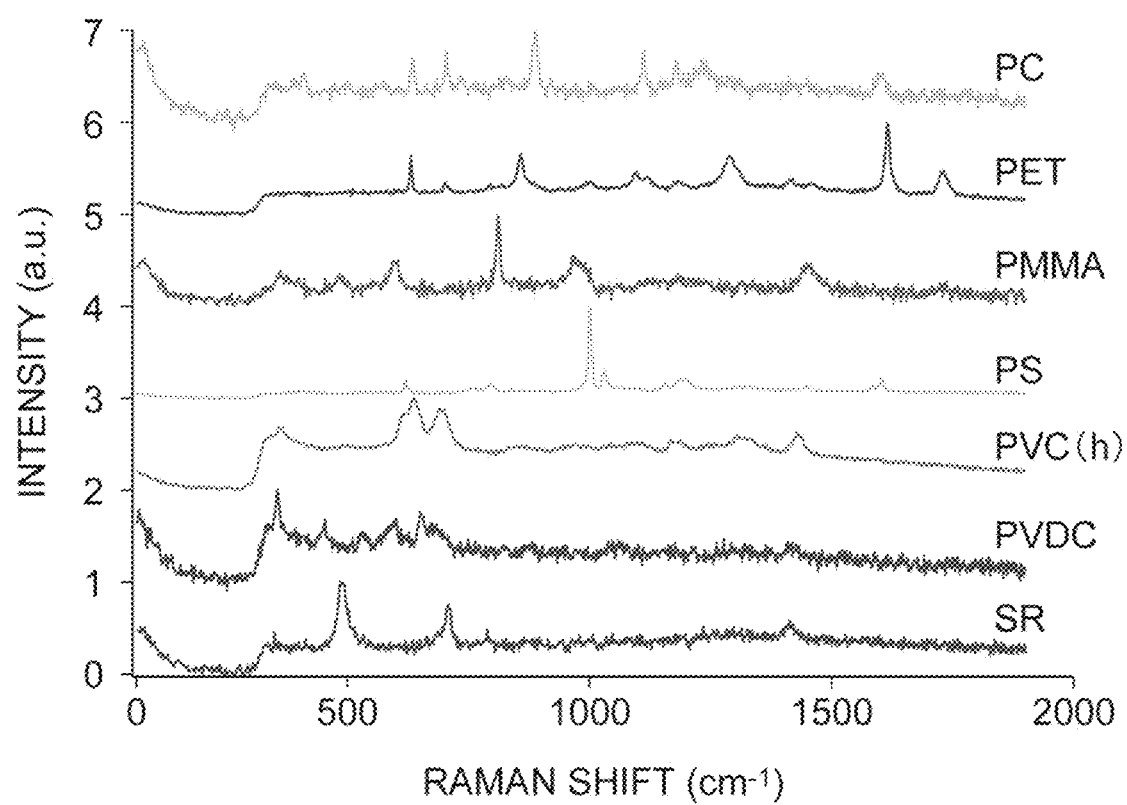
FIG. 3 is a diagram illustrating an example of Raman spectra of respective resin materials as reference objects.

In the learning step, 100 Raman spectra were used as training data for each resin material as the reference object. A total of 700 (=100×7 types) of data pieces were used as the training data. In the case of PC, for example, two-dimensional array data was generated in the array conversion step on the basis of the Raman spectrum of a resin material consisting only of PC. Then, the two-dimensional array data was input to the deep neural network, with the training label for PC set to value 1 and the training labels for other resin materials set to value 0, to train the deep neural network. FIG. 3 is a diagram illustrating an example of Raman spectra of respective resin materials as the reference objects. FIG. 4 is a table illustrating values of the training labels for respective resin materials for learning the Raman spectrum of PC as the reference object.

In the analysis step, 40 Raman spectra were used as analysis object data for each resin material as the analysis object. A total of 280 (=40×7 types) data pieces were used as the analysis object data. For example, in the case of PC, four types of Raman spectra of the resin material consisting only of PC were prepared with different signal-to-noise ratios, and two-dimensional array data was generated in the array conversion step on the basis of each Raman spectrum. Then, the two-dimensional array data was input to the deep neural network to obtain output labels from the deep neural network.

Figure 5:
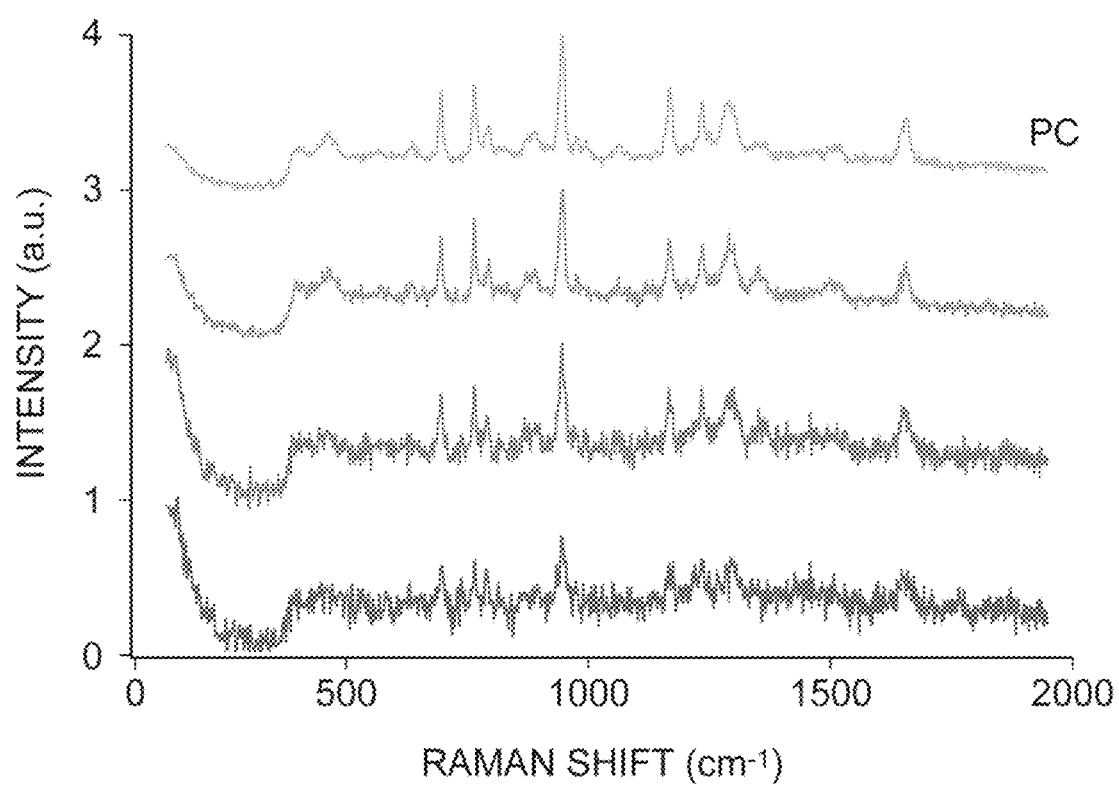
FIG. 5 is a diagram illustrating an example of the Raman spectrum of PC as an analysis object.

FIG. 5 is a diagram illustrating an example of the Raman spectrum of PC as the analysis object. This figure illustrates four Raman spectra with different SN ratios. FIG. 6 is a diagram illustrating an example of the output labels when the two-dimensional array data based on the Raman spectrum of PC as the analysis object is input to the deep neural network. In the example of this figure, the value of the output label of PC is the largest among the output labels of the respective resin materials output from the deep neural network, so that the analysis object is classified as PC.

In a first comparative example in comparison with the first example, the analysis object was classified as any one of the seven types of reference objects by multivariate analysis, as described below. That is, on the basis of the result of performing principal component analysis (PCA) on the training data, a seven-class pattern identifier was formed by a support vector machine (SVM). The number of principal components of PCA was 8, and the contribution rate of PCA was 0.968. The analysis object data was input to the pattern identifier by SVM.

FIG. 7 includes tables summarizing classification results in the first example and the first comparative example. (a) in FIG. 7 illustrates a classification result of the first example, and (b) in FIG. 7 illustrates a classification result of the first comparative example. In the first comparative example, among 280 analysis object data pieces, the classification results of 10 analysis object data pieces of PS with the lowest SN ratio were incorrect. On the other hand, in the first example, all of 280 analysis object data pieces were able to be correctly classified. Thus, compared with the first comparative example using the multivariate analysis, the first example using the deep neural network was able to be classified with higher accuracy.

In the second example, a mixing ratio of the reference object contained in the analysis object was determined, as described below.

In the learning step, the Raman spectrum of a mixture containing one or two types of the seven types of resin materials as reference objects and having a known mixing ratio was used as the training data. For example, in the case of a mixture of PC and PET, the mixing ratio of PC and PET was set to x:(1−x), with x being incremented by 0.1 in the range of 0 to 1, and the Raman spectra of mixtures having 11 different mixing ratios were prepared. In addition, although PC is 100% when x=1 and PET is 100% when x=0, these are referred to as mixtures herein for convenience.

The number of training data pieces was 3 for each resin material (x=0) (subtotal 21 (=3×7 types)), and 3 for a mixture containing any two types of resin materials (a mixing ratio of nine types of x=0.1 to 0.9) (subtotal 567 (=3×$_7C_2$×9), thus providing the total number 588. $_7C_2$ indicates 7×6/2, representing the number of combinations in selecting two types out of seven types. The Raman spectrum of the mixture was prepared by weighted averaging of the Raman spectra of the respective resin materials by the mixing ratios.

Figure 8:
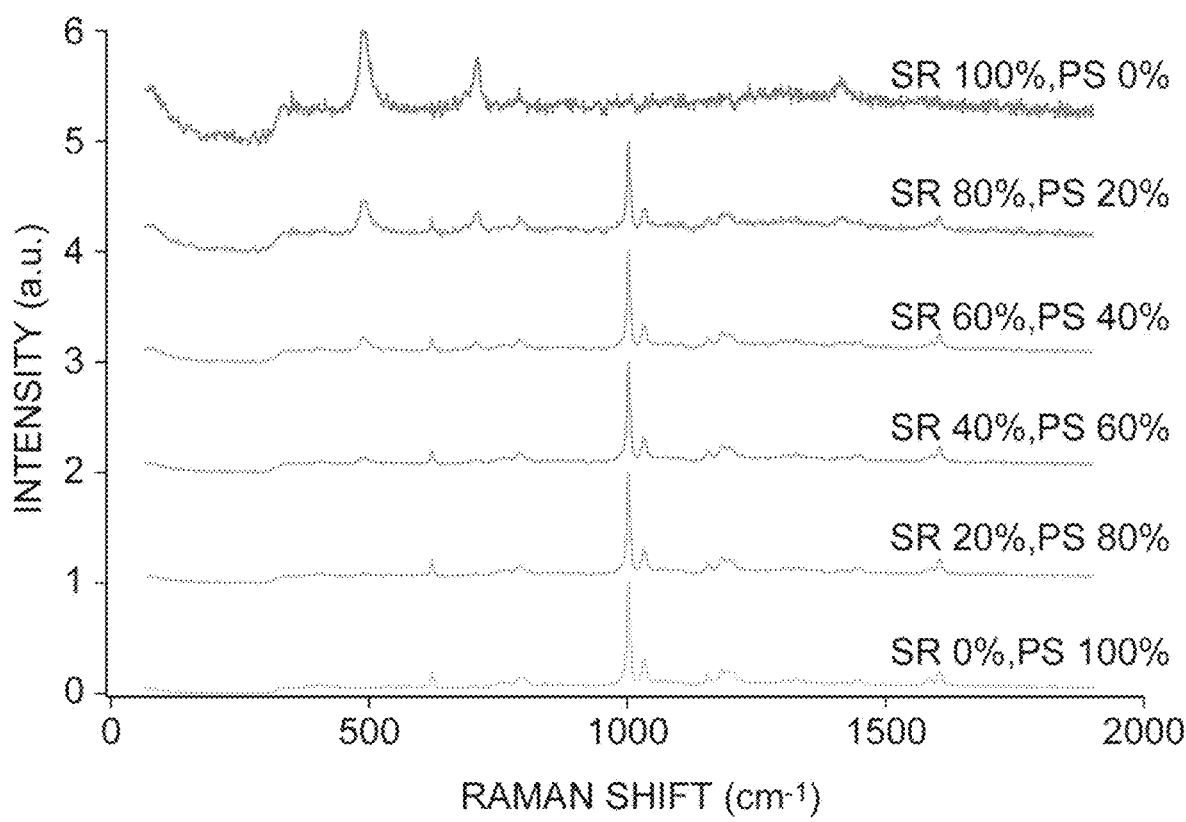
FIG. 8 is a diagram illustrating an example of Raman spectra of mixtures of SR and PS.

Two-dimensional array data was generated in the array conversion step on the basis of the Raman spectrum of the mixture. Then, the two-dimensional array data was input to the deep neural network, with the training labels of values corresponding to the mixing ratios, to train the deep neural network. FIG. 8 is a diagram illustrating an example of the Raman spectra of the mixtures of SR and PS. FIG. 9 is a table illustrating values of the training labels for respective resin materials for learning the Raman spectrum of the mixture of PC and PMMA (mixing ratio 0.8:0.2).

In the analysis step, a Raman spectrum of a mixture containing one or two types of the seven types of resin materials as the reference objects and having a known mixing ratio was used as the analysis object data. The analysis object data was created in the same manner as the training data. The number of analysis object data pieces was 1 for each resin material (x=0), and 1 for each mixture containing any two resin materials (a mixing ratio of nine types of x=0.1 to 0.9), thus providing the total number 196.

FIG. 10 is a diagram illustrating an example of output labels when two-dimensional array data based on the Raman spectrum of the mixture of PC and PMMA (mixing ratio 0.8:0.2) as the analysis object is input to the deep neural network. In the example of this figure, among the output labels for respective resin materials output from the deep neural network, the value of the output label of PC is 0.75, the value of the output label of PMMA is 0.15, and the value of the output label of PVDC is 0.10, so that it is determined that the analysis object is the mixture of three types of resin materials of PC, PMMA, and PVDC, and the mixing ratio is 0.75:0.15:0.10.

In a second comparative example in comparison with the second example, a mixing ratio of the reference object contained in the analysis object was determined by multivariate analysis, as described below. That is, a calibration curve was created by multivariate linear regression (MLR) on the basis of the result of applying PCA to the training data, and quantification was performed using this calibration curve. The number of principal components of PCA was 10, and the contribution rate of PCA was 0.994.

Figure 11:
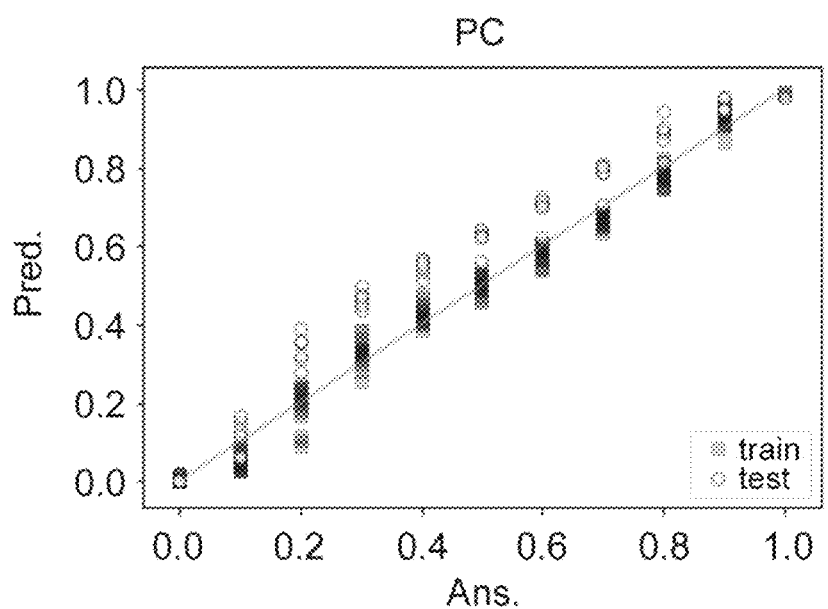
FIG. 11 includes diagrams illustrating quantification results of PC in a second example and a second comparative example, and illustrates (a) a quantification result of the second example and (b) a quantification result of the second comparative example.
Figure 11:
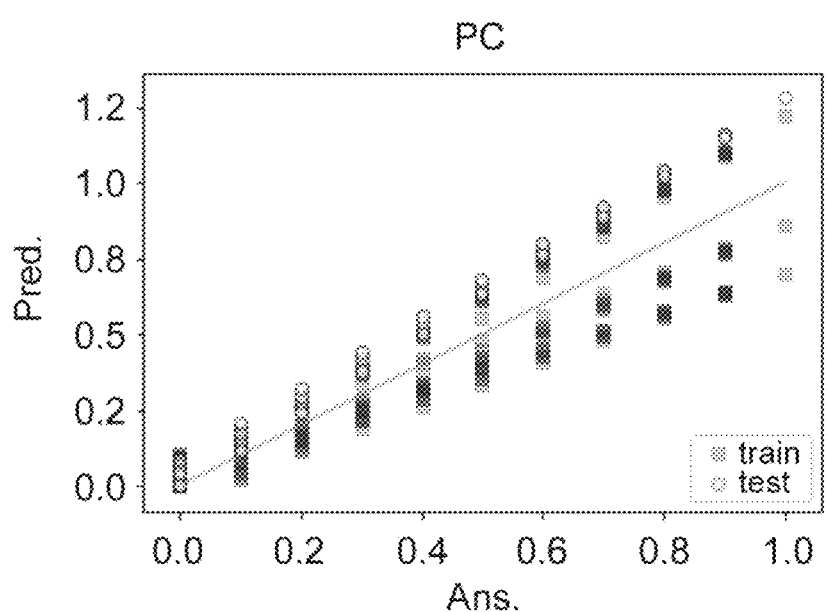
Figure 12:
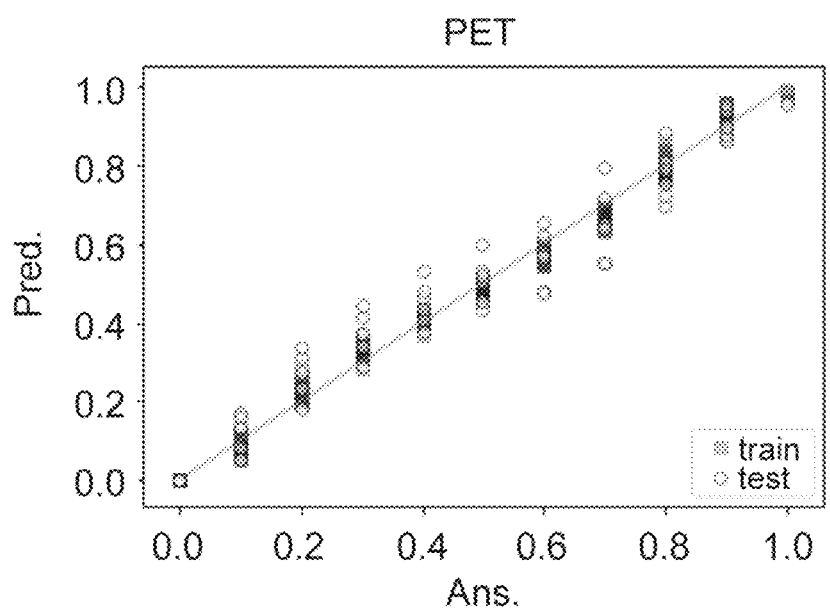
FIG. 12 includes diagrams illustrating quantification results of PET in the second example and the second comparative example, and illustrates (a) a quantification result of the second example and (b) a quantification result of the second comparative example.
Figure 12:
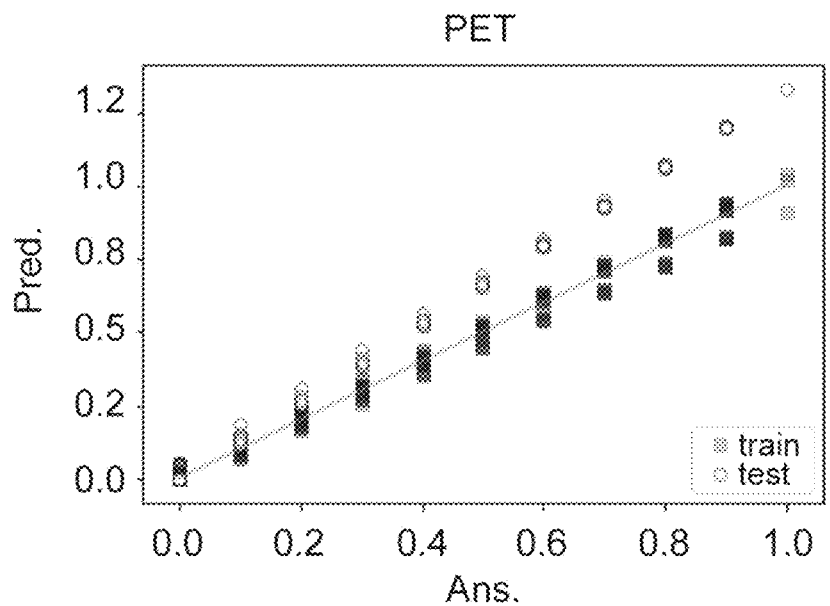
Figure 13:
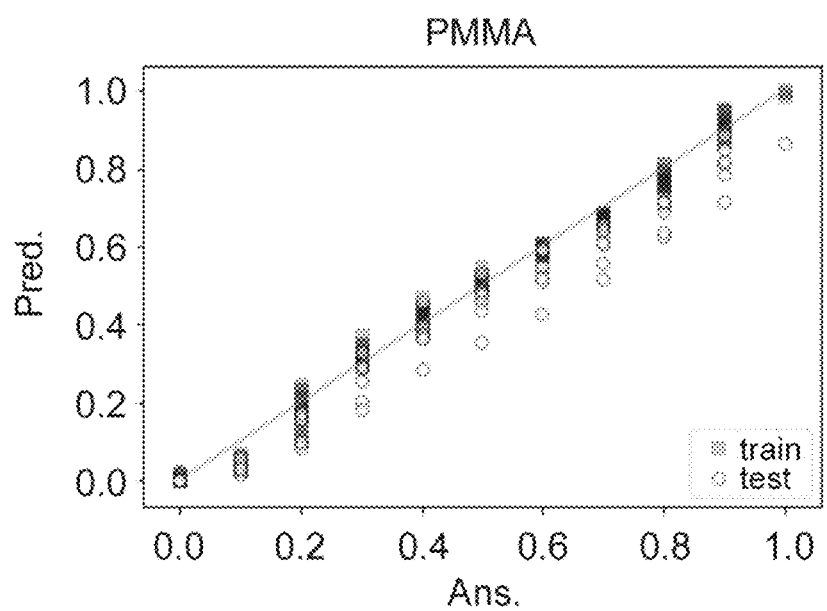
FIG. 13 includes diagrams illustrating quantification results of PMMA in the second example and the second comparative example, and illustrates (a) a quantification result of the second example and (b) a quantification result of the second comparative example.
Figure 13:
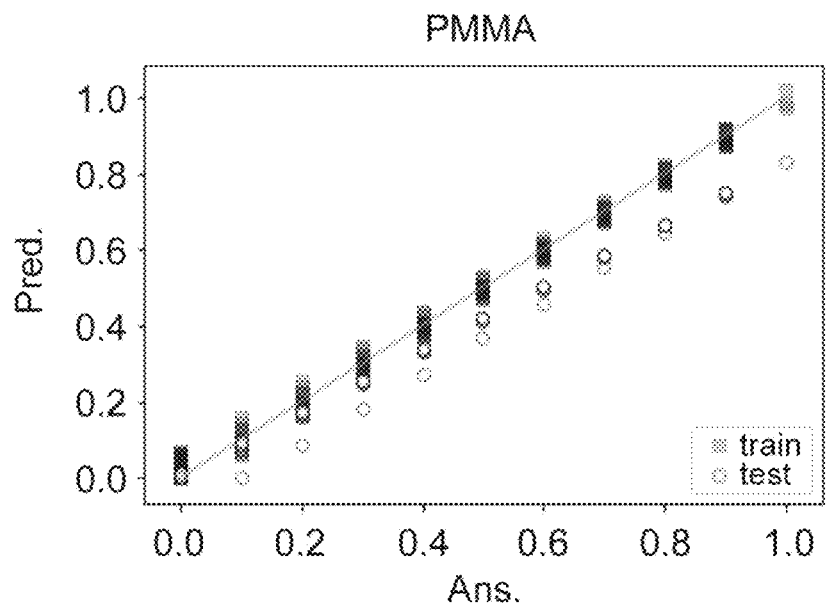
Figure 14:
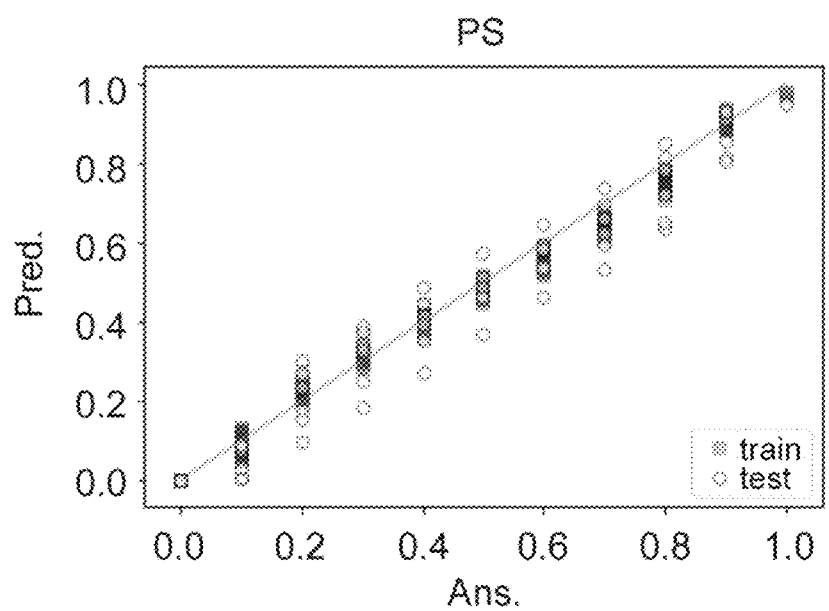
FIG. 14 includes diagrams illustrating quantification results of PS in the second example and the second comparative example, and illustrates (a) a quantification result of the second example and (b) a quantification result of the second comparative example.
Figure 14:
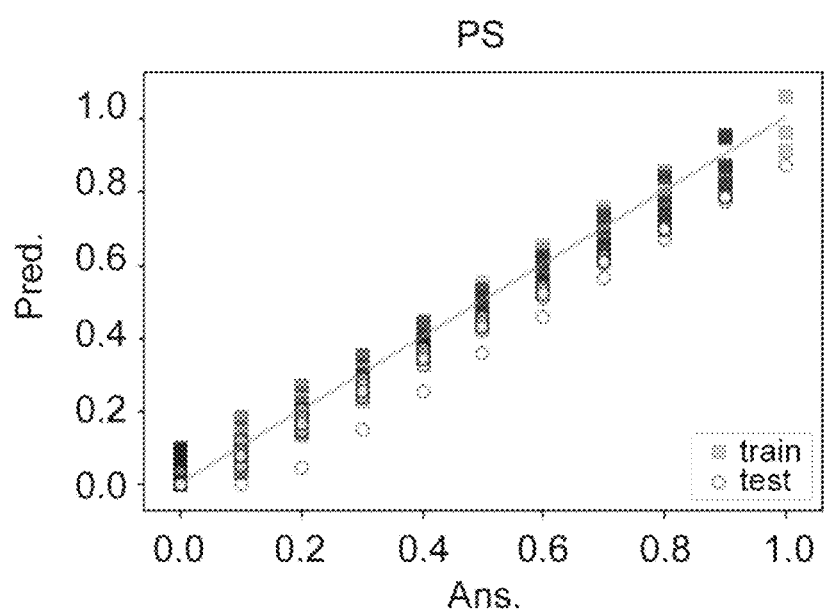
Figure 15:
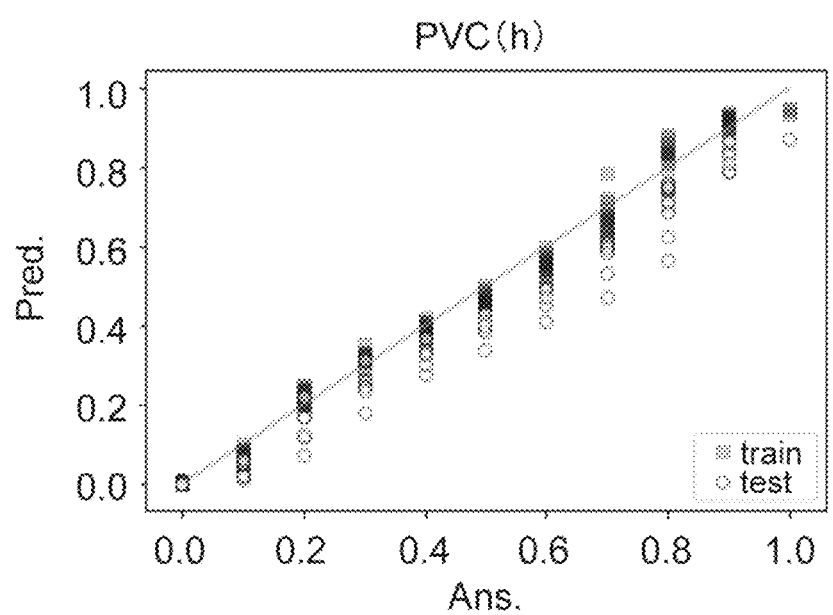
FIG. 15 includes diagrams illustrating quantification results of PVC(h) in the second example and the second comparative example, and illustrates (a) a quantification result of the second example and (b) a quantification result of the second comparative example.
Figure 15:
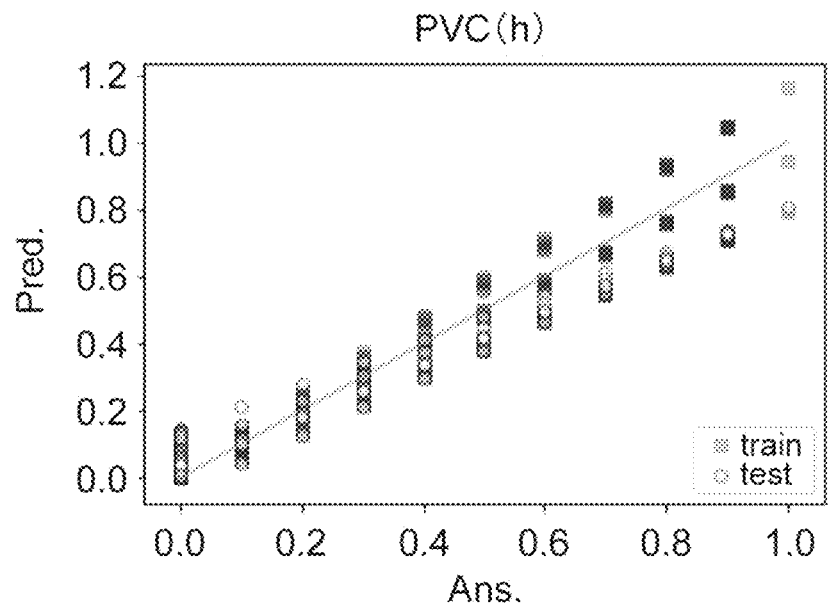
Figure 16:
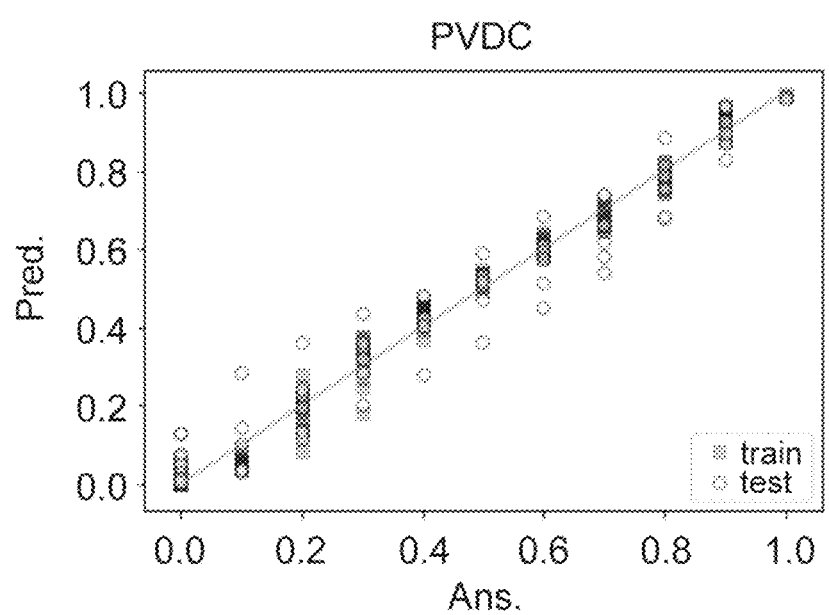
FIG. 16 includes diagrams illustrating quantification results of PVDC in the second example and the second comparative example, and illustrates (a) a quantification result of the second example and (b) a quantification result of the second comparative example.
Figure 16:
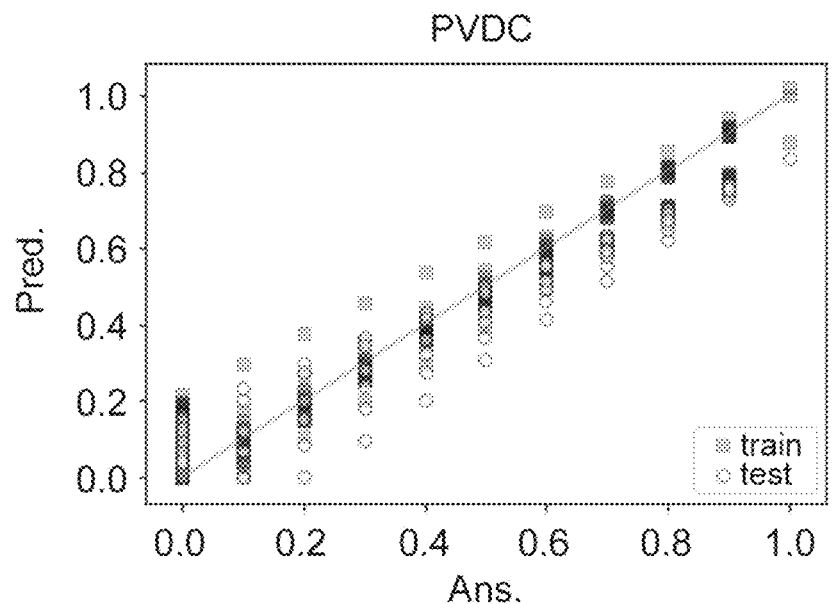
Figure 17:
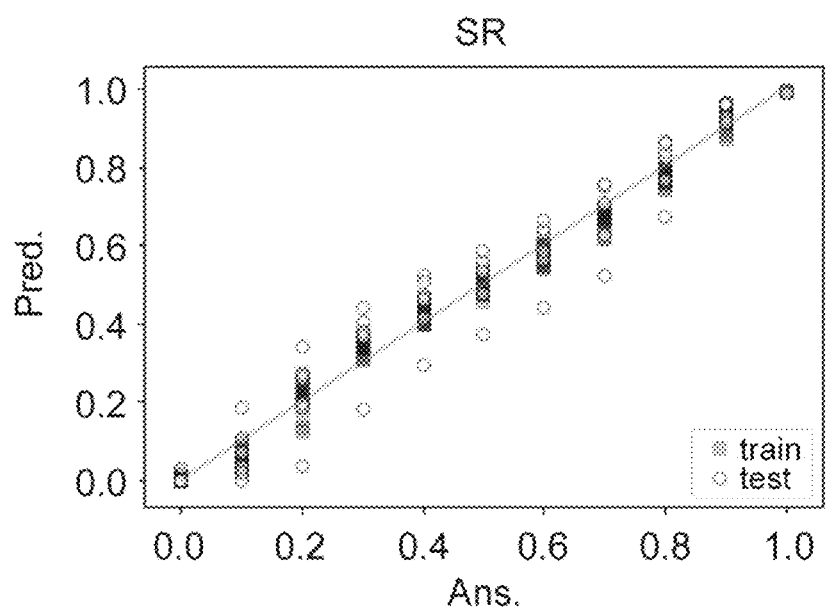
FIG. 17 includes diagrams illustrating quantification results of SR in the second example and the second comparative example, and illustrates (a) a quantification result of the second example and (b) a quantification result of the second comparative example.
Figure 17:
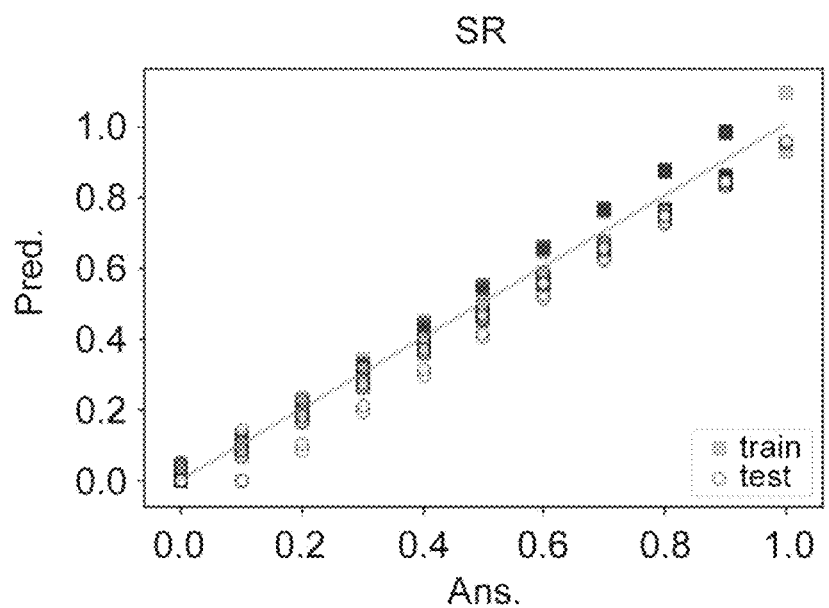

FIG. 11 to FIG. 17 are diagrams illustrating quantification results in the second example and the second comparative example. FIG. 11 illustrates the quantification results of PC. FIG. 12 illustrates the quantification results of PET. FIG. 13 illustrates the quantification results of PMMA. FIG. 14 illustrates the quantification results of PS. FIG. 15 illustrates the quantification results of PVC(h). FIG. 16 illustrates the quantification results of PVDC. FIG. 17 illustrates the quantification results of SR. In each figure, (a) illustrates the quantification result in the second example. In each figure, (b) illustrates the quantification result in the second comparative example. Further, each figure illustrates the relationship between the true mixing ratio (horizontal axis) and the mixing ratio (vertical axis) of the quantification result for each of the training data and the analysis object data. The difference between the true mixing ratio and the mixing ratio of the quantification result was evaluated by the root mean square error to obtain 0.0473 in the second example and 0.0762 in the second comparative example. Thus, compared with the second comparative example using the multivariate analysis, the second example using the deep neural network can perform the quantitative analysis with high accuracy.

In the third example, the analysis object was classified as any one of the seven types of reference objects, in substantially the same manner as in the first example. A total of 700 (=100×7 types) of data pieces were used as the training data. A total of 280 (=40×7 types) data pieces were used as the analysis object data. The third example was the same as the first example in that the data size of the training spectrum was 1024, but was different in that the data size of the analysis object spectrum was 256.

Figure 18:
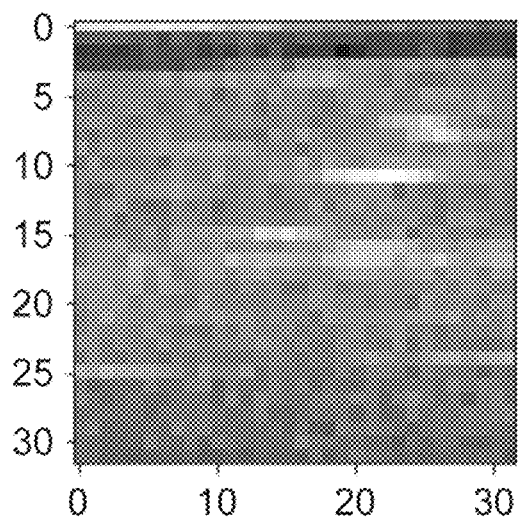
FIG. 18 includes diagrams illustrating an example of a spectrum for training before compression and two-dimensional array data, and illustrates (a) two-dimensional array data and (b) a spectrum.
Figure 18:
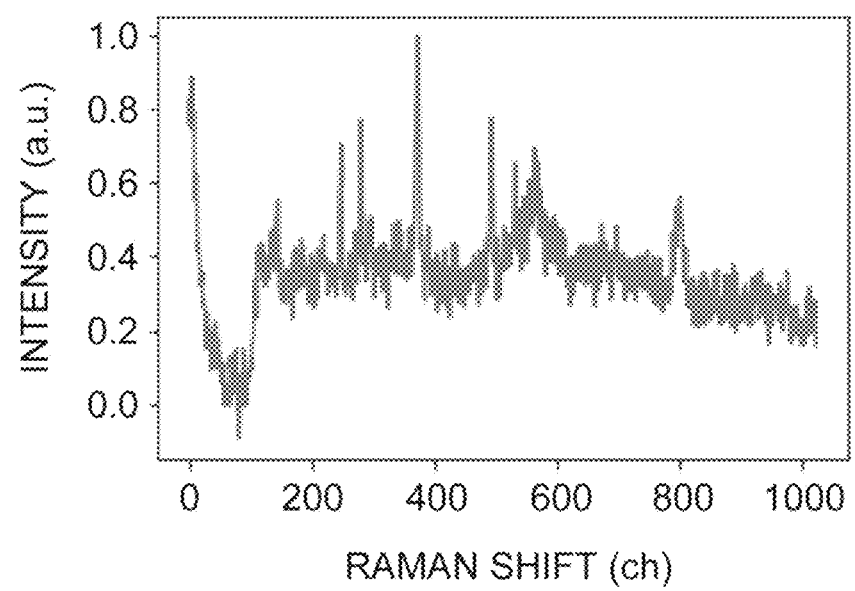
Figure 19:
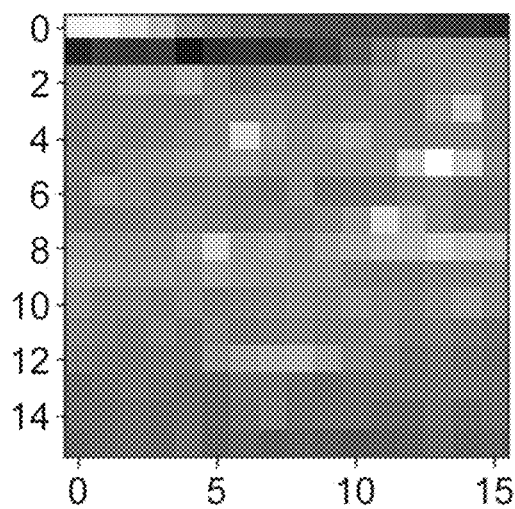
FIG. 19 includes diagrams illustrating an example of a spectrum for training after compression and two-dimensional array data, and illustrates (a) two-dimensional array data and (b) a spectrum.
Figure 19:
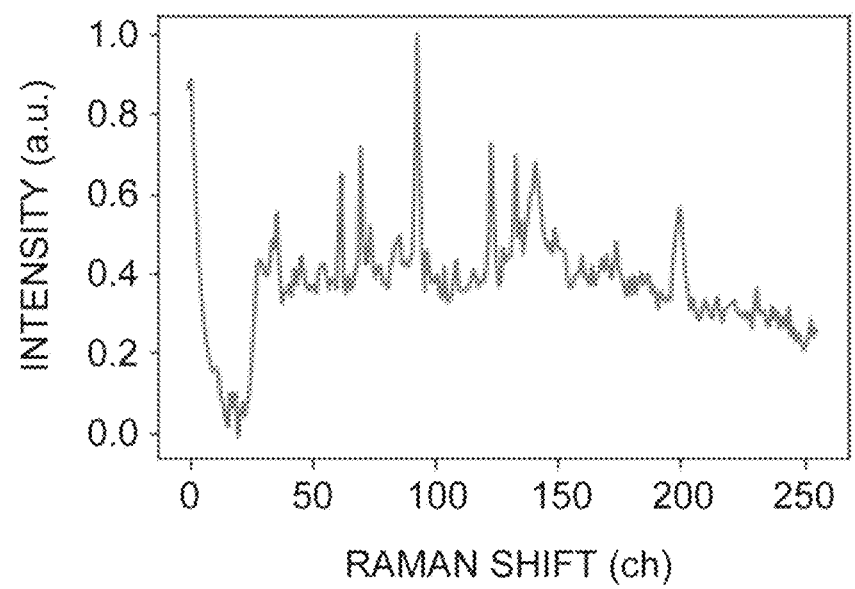
Figure 20:
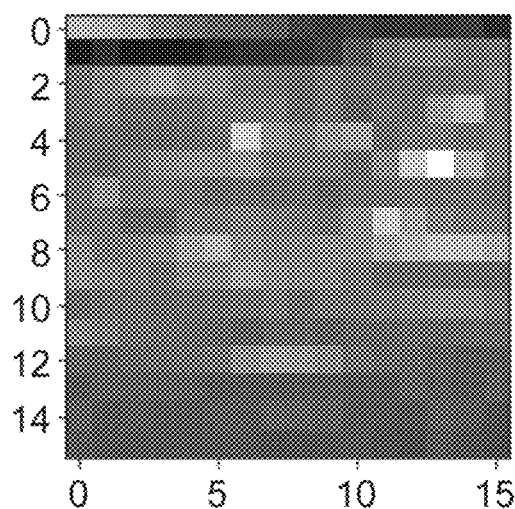
FIG. 20 includes diagrams illustrating an example of a spectrum of an analysis object and two-dimensional array data, and illustrates (a) two-dimensional array data and (b) a spectrum.
Figure 20:
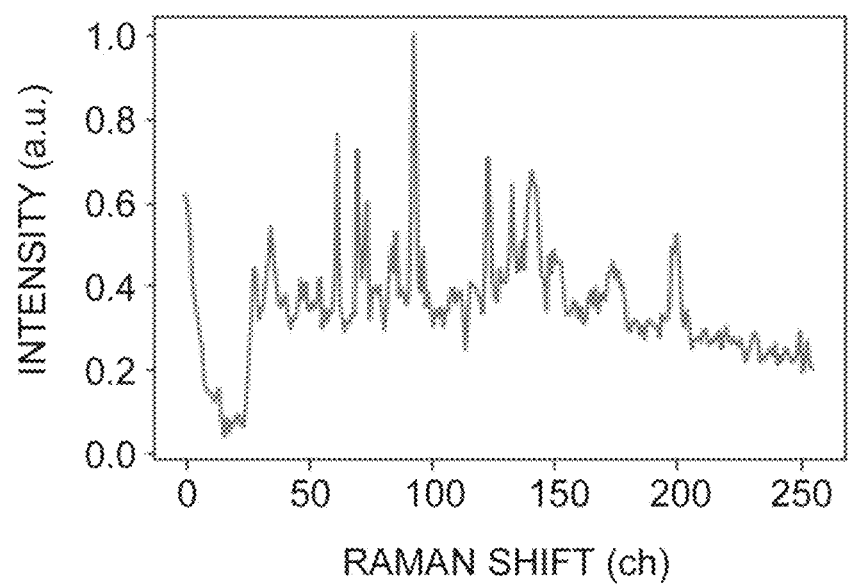

In order to set both the training data and the analysis object data to the two-dimensional array data of 16 rows and 16 columns, the data size of the training spectrum was compressed to 256 by wavelet transform, and the two-dimensional array data was generated in the array conversion step on the basis of the compressed spectrum. FIG. 18 includes diagrams illustrating an example of the training spectrum before compression and the two-dimensional array data. FIG. 19 includes diagrams illustrating an example of the training spectrum after compression and the two-dimensional array data. FIG. 20 includes diagrams illustrating an example of the analysis object spectrum and the two-dimensional array data. In each figure, (a) illustrates the two-dimensional array data. In each figure, (b) illustrates the spectrum.

In a third comparative example in comparison with the third example, the analysis object was classified as any one of the seven types of reference objects by multivariate analysis (PCA and SVM) as in the first comparison example. The number of principal components of PCA was 8, and the contribution ratio of PCA was 0.974.

FIG. 21 includes tables summarizing classification results in the third example and the third comparative example. (a) in FIG. 21 illustrates the classification result of the third example, and (b) in FIG. 21 illustrates the classification result of the third comparative example. A correct answer rate was 97.4% in the third comparative example, and a correct answer rate was 99.3% in the third example. As described above, even when the spectrum data size is compressed, the third example using the deep neural network achieved classification with higher accuracy than the third comparative example using the multivariate analysis.

In addition, in the analysis of the analysis object performed by the analysis unit 40, a feature visualization method used for image recognition may be applied to a spectrum, and the feature visualization method may be used to, for example, extract feature portions in the spectrum.

Here, an example using a technique called Grad-CAM (gradient-weighted class activation mapping) (see Non Patent Document 2) in the field of deep learning is described as the feature visualization method. This is one of the techniques for visualizing judgment criteria of obtained classification results in the convolutional neural network. By applying such a technique to the spectrum, it can be expected to be used for verification of the validity of the model (for example, determining whether or not a peak that humans use for identification is focused), and can also be expected to be used for extraction of features that have not been focused by humans.

The algorithm used in the Grad-CAM described above is briefly described. First, a label for which it is desired to obtain judgment criteria is specified. After that, how much the change in respective trained feature maps (a convolutional layer or a pooling layer passed through before the predicted label is obtained) affects the prediction result is calculated. This calculation has a meaning to specify a portion having a large influence on the prediction result by changing the value of each pixel in each map slightly and sequentially to see the amount of change that affects the subsequent stage. In general, this processing is expressed as acquisition of a gradient. When the change amount maps obtained for the respective maps are added together, it is possible to extract a portion having a large influence on the subsequent stage, that is, a feature portion based on which the judgment is made.

Figure 22:
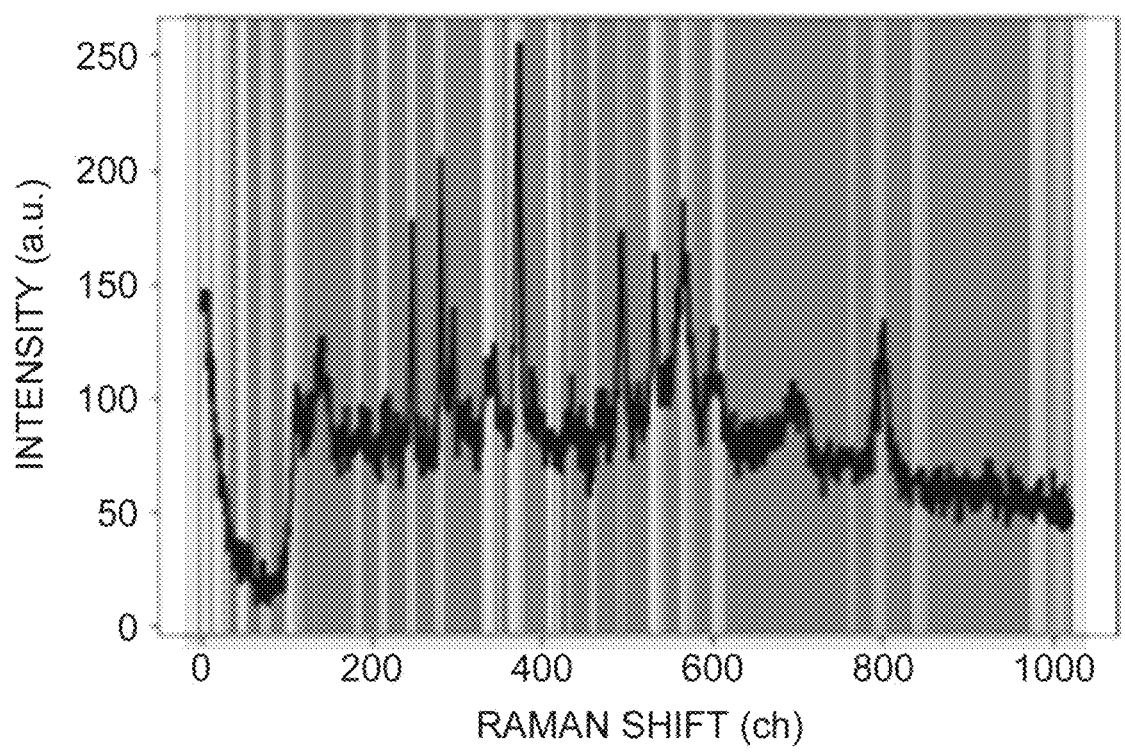
FIG. 22 is a diagram illustrating an example of a heat map of the spectrum classified as PC in the first example.

FIG. 22 is a diagram illustrating an example of a heat map of the spectrum classified as polycarbonate (PC) in the first example. In this figure, the sum of the change amount maps obtained by the above method is multiplied by an activation function and displayed as a heat map superimposed on the original spectrum, and portions where the deep learning model has determined to be important are highlighted.

In addition, as described above, Grad-CAM is one of the feature visualization methods for performing, for example, extraction of feature portions in the spectrum. Although the method of calculating the amount of change given by each pixel is used in common, as the feature portion extraction method, various methods such as SmoothGrad (see Non Patent Document 3) can be used other than Grad-CAM.

The spectrum analysis apparatus and the spectrum analysis method according to the present invention are not limited to the above embodiments and configuration examples, and various modifications are possible.

The spectrum analysis apparatus of the above embodiment is an apparatus for analyzing an analysis object on the basis of a spectrum of light generated in the analysis object containing any one or two or more of a plurality of reference objects, and is configured to include (1) an array conversion unit for generating two-dimensional array data on the basis of a spectrum of light; (2) a processing unit including a deep neural network; and (3) an analysis unit for inputting the two-dimensional array data generated by the array conversion unit on the basis of the spectrum of light generated in the analysis object, into the deep neural network, and analyzing the analysis object on the basis of data output from the deep neural network.

In the analysis apparatus of the above configuration, the array conversion unit may generate the two-dimensional array data by normalizing the spectrum in a manner that a peak intensity of the spectrum has a predetermined value. Further, in the analysis apparatus of the above configuration, the array conversion unit may generate the two-dimensional array data by arranging M×N data pieces including all or part of data of the spectrum in M rows and N columns.

The analysis apparatus of the above configuration may further include a learning unit for training the deep neural network by inputting the two-dimensional array data generated by the array conversion unit on the basis of the spectrum of light generated in each of the plurality of reference objects, into the deep neural network. In this case, the learning unit may input the two-dimensional array data generated by the array conversion unit on the basis of the spectrum of light generated in a mixture containing any one or two or more of the plurality of reference objects and having a known mixing ratio, into the deep neural network, and train the deep neural network using the mixing ratio.

In the analysis apparatus of the above configuration, the analysis unit may classify the analysis object as any one of the plurality of reference objects on the basis of the data output from the deep neural network. Further, in the analysis apparatus of the above configuration, the analysis unit may determine a mixing ratio of the reference object contained in the analysis object on the basis of the data output from the deep neural network. Further, in the analysis apparatus of the above configuration, the analysis unit may extract a feature portion in the spectrum using a feature visualization method.

The spectrum analysis method of the above embodiment is a method for analyzing an analysis object on the basis of a spectrum of light generated in the analysis object containing any one or two or more of a plurality of reference objects, and is configured to include (1) an array conversion step of generating two-dimensional array data on the basis of a spectrum of light; and (2) an analysis step of, using a processing unit including a deep neural network, inputting the two-dimensional array data generated in the array conversion step on the basis of the spectrum of light generated in the analysis object, into the deep neural network, and analyzing the analysis object on the basis of data output from the deep neural network.

In the analysis method of the above configuration, the array conversion step may generate the two-dimensional array data by normalizing the spectrum in a manner that a peak intensity of the spectrum has a predetermined value. Further, in the analysis method of the above configuration, the array conversion step may generate the two-dimensional array data by arranging M×N data pieces including all or part of data of the spectrum in M rows and N columns.

The analysis method of the above configuration may further include a learning step of training the deep neural network by inputting the two-dimensional array data generated in the array conversion step on the basis of the spectrum of light generated in each of the plurality of reference objects, into the deep neural network. In this case, the learning step may input the two-dimensional array data generated in the array conversion step on the basis of the spectrum of light generated in a mixture containing any one or two or more of the plurality of reference objects and having a known mixing ratio, into the deep neural network, and train the deep neural network using the mixing ratio.

In the analysis method of the above configuration, the analysis step may classify the analysis object as any one of the plurality of reference objects on the basis of the data output from the deep neural network. Further, in the analysis method of the above configuration, the analysis step may determine a mixing ratio of the reference object contained in the analysis object on the basis of the data output from the deep neural network. Further, in the analysis method of the above configuration, the analysis step may extract a feature portion in the spectrum using a feature visualization method.

INDUSTRIAL APPLICABILITY

The present invention can be used as an apparatus and a method that can perform highly efficient and highly accurate spectrum analysis.

REFERENCE SIGNS LIST

1—spectrum analysis apparatus, 10—array conversion unit, 20—processing unit, 30—learning unit, 40—analysis unit.

The invention claimed is:

1. A spectrum analysis apparatus for analyzing an analysis object on the basis of a spectrum of light generated in the analysis object containing any one or two or more of a plurality of reference objects, the apparatus being a computer comprising:
an array conversion unit configured to generate two-dimensional array data on the basis of a spectrum of light;
a processing unit including a deep neural network; and
an analysis unit configured to input the two-dimensional array data generated by the array conversion unit on the basis of the spectrum of light generated in the analysis object into the deep neural network, and analyze the analysis object on the basis of data output from the deep neural network,
wherein the analysis unit is configured to determine a mixing ratio of the reference object contained in the analysis object on the basis of the data output from the deep neural network.

2. The spectrum analysis apparatus according to claim 1, wherein the array conversion unit is configured to generate the two-dimensional array data by normalizing the spectrum in a manner that a peak intensity of the spectrum has a predetermined value.

3. The spectrum analysis apparatus according to claim 1, wherein the array conversion unit is configured to generate the two-dimensional array data by arranging M×N data pieces including all or part of data of the spectrum in M rows and N columns.

4. The spectrum analysis apparatus according to claim 1, further comprising:
a learning unit configured to train the deep neural network by inputting the two-dimensional array data generated by the array conversion unit on the basis of the spectrum of light generated in each of the plurality of reference objects into the deep neural network.

5. The spectrum analysis apparatus according to claim 4, wherein the learning unit is configured to input the two-dimensional array data generated by the array conversion unit on the basis of the spectrum of light generated in a mixture containing any one or two or more of the plurality of reference objects and having a known mixing ratio into the deep neural network, and train the deep neural network using the mixing ratio.

6. The spectrum analysis apparatus according to claim 1, wherein the analysis unit is configured to classify the analysis object as any one of the plurality of reference objects on the basis of the data output from the deep neural network.

7. The spectrum analysis apparatus according to claim 1, wherein the analysis unit is configured to extract a feature portion in the spectrum using a feature visualization method.

8. A spectrum analysis method for analyzing an analysis object on the basis of a spectrum of light generated in the analysis object containing any one or two or more of a plurality of reference objects, the method comprising:
an array conversion step of generating two-dimensional array data on the basis of a spectrum of light; and
an analysis step of, using a processing unit including a deep neural network, inputting the two-dimensional array data generated in the array conversion step on the basis of the spectrum of light generated in the analysis object into the deep neural network, and analyzing the analysis object on the basis of data output from the deep neural network,
wherein the analysis step determines a mixing ratio of the reference object contained in the analysis object on the basis of the data output from the deep neural network.

9. The spectrum analysis method according to claim 8, wherein the array conversion step generates the two-dimensional array data by normalizing the spectrum in a manner that a peak intensity of the spectrum has a predetermined value.

10. The spectrum analysis method according to claim 8, wherein the array conversion step generates the two-dimensional array data by arranging M×N data pieces including all or part of data of the spectrum in M rows and N columns.

11. The spectrum analysis method according to claim 8, further comprising:
a learning step of training the deep neural network by inputting the two-dimensional array data generated in the array conversion step on the basis of the spectrum of light generated in each of the plurality of reference objects into the deep neural network.

12. The spectrum analysis method according to claim 11, wherein the learning step inputs the two-dimensional array data generated in the array conversion step on the basis of the spectrum of light generated in a mixture containing any one or two or more of the plurality of reference objects and having a known mixing ratio into the deep neural network, and trains the deep neural network using the mixing ratio.

13. The spectrum analysis method according to claim 8, wherein the analysis step classifies the analysis object as any one of the plurality of reference objects on the basis of the data output from the deep neural network.

14. The spectrum analysis method according to claim 8, wherein the analysis step extracts a feature portion in the spectrum using a feature visualization method.

15. A spectrum analysis apparatus for analyzing an analysis object on the basis of a spectrum of light generated in the analysis object containing any one or two or more of a plurality of reference objects, the apparatus being a computer comprising:
   an array conversion unit configured to generate two-dimensional array data on the basis of a spectrum of light;
   a processing unit including a deep neural network; and
   an analysis unit configured to input the two-dimensional array data generated by the array conversion unit on the basis of the spectrum of light generated in the analysis object into the deep neural network, and analyze the analysis object on the basis of data output from the deep neural network, wherein
   the array conversion unit is configured to generate the two-dimensional array data by preparing M×N data pieces arranged in order of wavenumber and including all or part of data of the spectrum, and
   arranging the M×N data pieces in M rows and N columns by arranging first N data pieces in order from a first column to an N-th column in a first row, arranging next N data pieces in order from a first column to an N-th column in a second row, and repeatedly performing the processes, and arranging last N data pieces in order from a first column to an N-th column in an M-th row.

16. A spectrum analysis method for analyzing an analysis object on the basis of a spectrum of light generated in the analysis object containing any one or two or more of a plurality of reference objects, the method comprising:
   an array conversion step of generating two-dimensional array data on the basis of a spectrum of light; and
   an analysis step of, using a processing unit including a deep neural network, inputting the two-dimensional array data generated in the array conversion step on the basis of the spectrum of light generated in the analysis object into the deep neural network, and analyzing the analysis object on the basis of data output from the deep neural network, wherein
   the array conversion step generates the two-dimensional array data by preparing M×N data pieces arranged in order of wavenumber and including all or part of data of the spectrum, and
   arranging the M×N data pieces in M rows and N columns by arranging first N data pieces in order from a first column to an N-th column in a first row, arranging next N data pieces in order from a first column to an N-th column in a second row, and repeatedly performing the processes, and arranging last N data pieces in order from a first column to an N-th column in an M-th row.

* * * * *